(12) United States Patent
Lee et al.

(10) Patent No.: US 7,903,111 B2
(45) Date of Patent: Mar. 8, 2011

(54) DEPTH IMAGE-BASED MODELING METHOD AND APPARATUS

(75) Inventors: Heesae Lee, Yongin-si (KR); Dokyoon Kim, Seongnam-si (KR); Shinjun Lee, Seoul (KR); Alexy Ignatenko, Moscow (RU); Maxim Fedyukov, Moscow (RU)

(73) Assignee: Samsung Electronics Co., Ltd., Suwon-Si (KR)

( * ) Notice: Subject to any disclaimer, the term of this patent is extended or adjusted under 35 U.S.C. 154(b) by 649 days.

(21) Appl. No.: 11/327,350

(22) Filed: Jan. 9, 2006

(65) Prior Publication Data

US 2006/0152507 A1 Jul. 13, 2006

(30) Foreign Application Priority Data

Jan. 8, 2005 (KR) .................. 10-2005-0001951

(51) Int. Cl.
*G06T 17/00* (2006.01)
(52) U.S. Cl. ........................................ 345/420
(58) Field of Classification Search .......... 345/953
See application file for complete search history.

(56) References Cited

U.S. PATENT DOCUMENTS

| | | | | | |
|---|---|---|---|---|---|
| 5,841,443 | A | * | 11/1998 | Einkauf | 345/586 |
| 6,130,673 | A | * | 10/2000 | Pulli et al. | 345/428 |
| 6,445,390 | B1 | * | 9/2002 | Aftosmis et al. | 345/421 |
| 6,580,425 | B1 | * | 6/2003 | Zwicker et al. | 345/420 |
| 6,639,597 | B1 | * | 10/2003 | Zwicker et al. | 345/427 |
| 2003/0048266 | A1 | * | 3/2003 | Han et al. | 345/419 |
| 2003/0052878 | A1 | * | 3/2003 | Han et al. | 345/420 |
| 2003/0214502 | A1 | * | 11/2003 | Park et al. | 345/420 |
| 2003/0218606 | A1 | * | 11/2003 | Zhirkov et al. | 345/419 |

OTHER PUBLICATIONS

Z. J. Wang, Kumar Srinvasan, "An Adaptive Cartesian Grid Generation Method for Dirty Geometry," Jul. 2002, International Journal of Numerical Methods in Fluids, vol. 39, Issue 8, pp. 703-717.*
Alexander Zhirkov, "Binary Volumetric Octree Representation for Image Based Rendering," Sep. 2001, Proceedings of GRAPHICON '01.*
Bayakovski et al., "Image-Based Representations For Static and Animated Objects," Sep. 22, 2002, 2002 Proceedings of IEEE International Conference on Image Processing (ICIP), vol. 2, pp. 25-28.*
Marc Soucy, Guy Godin, Marc Rioux, "A Texture-Mapping Approach for the Compression of Colored 3D Triangulations," Dec. 18, 1996, The Visual Computer, vol. 12, No. 10, pp. 503-514.*
Levkovich-Maslyuyk et al. "Depth Image-Based Representation and Compression for Static and Animated 3-D Objects": IEEE Transaction on Circuits and Systems for Video Technology, vol. 14, No. 7 Jul. 2004 (pp. 1032-1045).
Bayakovski et al. "Depth image-based representations for static and animated 3D objects": Proceedings 2002 International Conference on Image Processing. Sep. 22, 2002, IEEE vol. 2 of 3, pp. 25-28.

(Continued)

*Primary Examiner* — Jason M Repko
(74) *Attorney, Agent, or Firm* — Staas & Halsey LLP

(57) ABSTRACT

A depth image-based modeling method and apparatus. A depth information-based modeling method using a three-dimensional (3D) polygonal mesh includes: extracting a bounding volume (BV) for the 3D polygonal mesh; obtaining a 3D grid by dividing the BV using a plurality of sampling lines; selecting some of a plurality of vertices of the 3D grid that intersect the 3D polygonal mesh as valid vertices; obtaining depth information and color information of the valid vertices by using a plurality of vertices of the 3D polygonal mesh; and modeling an object using the depth information and the color information of the valid vertices.

11 Claims, 8 Drawing Sheets

OTHER PUBLICATIONS

Levkovich-Maslyuk et al., Depth Image-Based Representation and Compression for Static and Animated 3-D Objects, IEEE Transactions on Circuits and Systems for Video Technology, vol. 14, No. 7, pp. 1032-1045, IEEE Service Center, Jul. 2004.

Bayakovski et al., Depth Image-Based Representations Static and Animated 3D Objects, 2002 Proceedings of IEEE International Conference on Image Processing, IEEE ICIP 2002, vol. 2 of 3, pp. 25-28, Sep. 22, 2002, New York, NY, U.S.A.

European Search Report issued Nov. 26, 2007 in Application No. 06076252.3-2218.

* cited by examiner

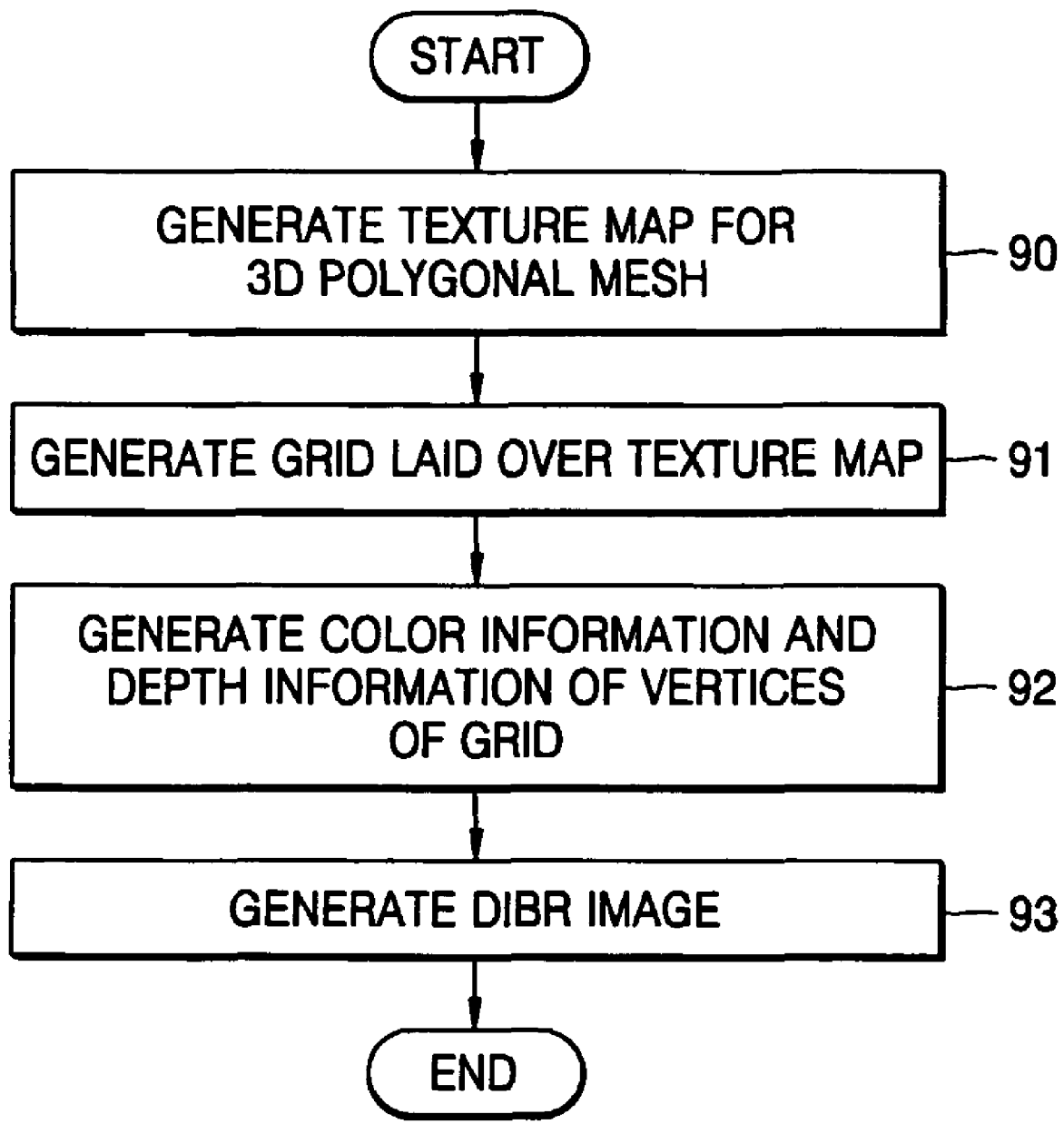

DEPTH IMAGE-BASED MODELING METHOD AND APPARATUS

CROSS-REFERENCE TO RELATED APPLICATION

This application claims the benefit of Korean Patent Application No. 10-2005-0001951, filed on Jan. 8, 2005, in the Korean Intellectual Property Office, the disclosure of which is incorporated herein by reference.

BACKGROUND OF THE INVENTION

1. Field of the Invention

The present invention relates to a depth image-based modeling method and apparatus, and more particularly, to a depth image-based modeling method and apparatus which obtain depth and color information from a polygonal model.

2. Description of Related Art

Depth image-based representation (DIBR) is a technique of synthesizing a plurality of images obtained from respective virtual points of an object rendered in a still or moving image and pixel-wise depth information of the images. In general, DIBR is divided into the following two processes: re-projecting a plurality of points of an original image to a three-dimensional (3D) space using depth information of each pixel of the original image; and projecting the re-projection results onto an image plane of a virtual camera located at a given viewing location. In other words, DIBR includes the re-projection of a two-dimensional (2D) image to a 3D world and the projection of the re-projection result back to a 2D space.

FIGS. 1A through 1C are diagrams illustrating a conventional DIBR modeling method. Referring to FIG. 1A, in the conventional DIBR modeling method, a plurality of virtual cameras 11 are placed at a plurality of locations near the object 10, thereby obtaining a plurality of images of an object 10. FIG. 1B illustrates a plurality of color images 12 and a plurality of depth images 13 of the object 10 of FIG. 1A obtained by the virtual cameras 11. The depth images 13 are gray scale images having depth information. The color images 12 and the depth images 13 of the object 10 are taken by the virtual cameras 11, which are respectively located on the left, right, upper, and lower sides of the object 10, as illustrated in FIG. 1A. FIG. 1C illustrates a DIBR image obtained by synthesizing the color images 12 and the depth images 13 of FIG. 1B.

The conventional DIBR modeling method, however, requires a plurality of virtual cameras to render an object, and thus results in a low rendering speed. This problem becomes more apparent when rendering of the object is complicated because the more complicated the rendering, the more virtual cameras are required.

In addition, in the conventional DIBR modeling method, a camera bounding volume (BV), which is a minimum volume that can surround an object as illustrated in FIGS. 2A and 2B, must be manually adjusted. Thus, a user's capability to manually adjust the camera BV has a considerable effect on the quality of a DIBR image. For example, FIG. 2A illustrates an example of a well-optimized BV, and FIG. 2B illustrates an example of a poorly optimized BV.

Moreover, in the conventional DIBR modeling method, a virtual camera range needs to be set by a user according to the complexity of an object to be rendered.

BRIEF SUMMARY

Additional aspects and/or advantages of the invention will be set forth in part in the description which follows and, in part, will be apparent from the description, or may be learned by practice of the invention.

An aspect of the present invention provides a depth information-based representation (DIBR) modeling method and apparatus which obtain 3D depth information and color information using vertex coordinates in a 3D polygonal mesh structure representing an object to be rendered.

According to an aspect of the present invention, there is provided a DIBR modeling method using a three-dimensional (3D) polygonal mesh. The DIBR modeling method includes: extracting a bounding volume (BV) for the 3D polygonal mesh; obtaining a 3D grid by dividing the BV using a plurality of sampling lines; selecting some of a plurality of vertices of the 3D grid that intersect the 3D polygonal mesh as valid vertices; obtaining depth information and color information of the valid vertices by using a plurality of vertices of the 3D polygonal mesh; and modeling an object using the depth information and the color information of the valid vertices.

According to another aspect of the present invention, there is provided a DIBR modeling method. The DIBR modeling method includes: converting a 3D polygonal mesh into a 2D polygonal mesh by generating a texture map for the 3D polygonal mesh; generating a grid laid over the 2D polygonal mesh; obtaining depth information and color information of a plurality of vertices of the grid by using a plurality of vertices of the 2D polygonal mesh; and modeling an object by using the depth information and the color information of the vertices of the grid.

According to another aspect of the present invention, there is provided a DIBR modeling apparatus. The DIBR modeling apparatus includes: a division unit which extracts a BV for a 3D polygonal mesh and obtains a 3D grid by dividing the BV using a plurality of sampling lines; a vertex extraction unit which selects some of a plurality of vertices of the 3D grid that intersect the 3D polygonal mesh as valid vertices; a depth information extraction unit which obtains depth information of the valid vertices by using a plurality of vertices of the 3D polygonal mesh; a color information extraction unit which generates a texture map for the vertices of the 3D grid and obtains color information of the valid vertices by using texture coordinates on the texture map that correspond to the vertices of the 3D grid; and a modeling unit which models an object using the depth information and the color information of the valid vertices.

According to another aspect of the present invention, there is provided a depth information-based modeling apparatus comprising: a texture map generator which converts a three-dimensional (3D) polygonal mesh into a two-dimensional (2D) polygonal mesh by generating a texture map for the 3D polygonal mesh; a grid generator which generates a grid laid over the 2D polygonal mesh; a depth information extracting unit which obtains depth information and color information of a plurality of vertices of the grid by using a plurality of vertices of the 2D polygonal mesh; and a modeling unit which models an object by using the depth information and the color information of the vertices of the grid.

According to other aspects of the present invention, there are provided computer-readable storage media encoded with processing instructions for causing a processor to execute the aforementioned methods of the present invention.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which:

FIG. 9 is a flowchart illustrating a DIBR modeling method according to another exemplary embodiment of the present invention;

DETAILED DESCRIPTION OF EMBODIMENTS

Figure 1A:
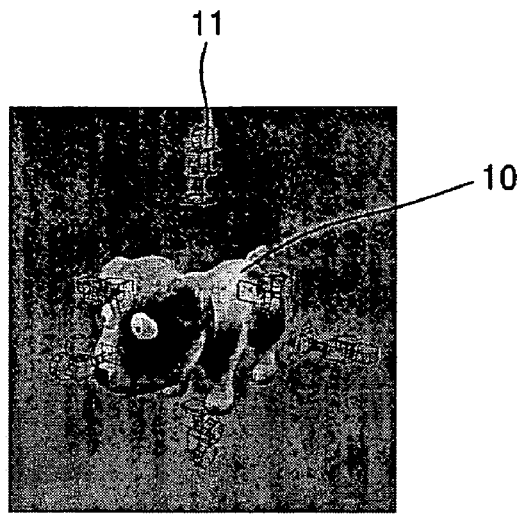
FIGS. 1A through 1C are diagrams illustrating a conventional depth image-based representation (DIBR) modeling method.
Figure 1B:
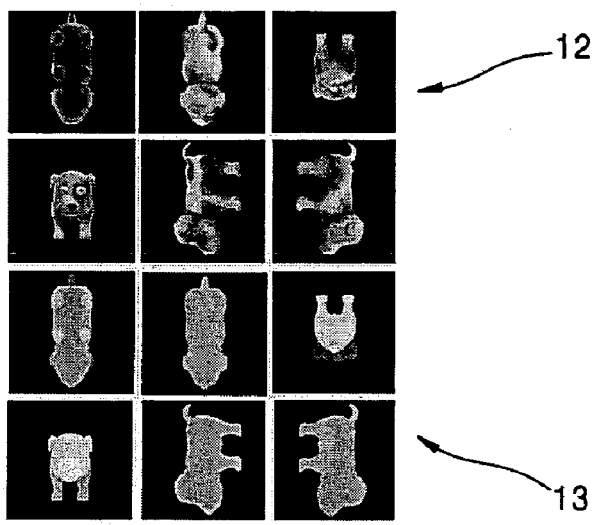
Figure 1C:
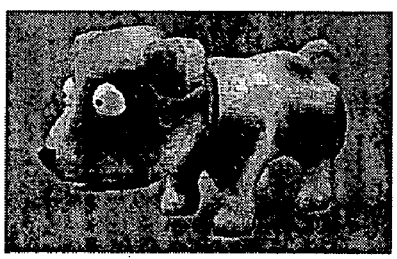
Figure 2A:
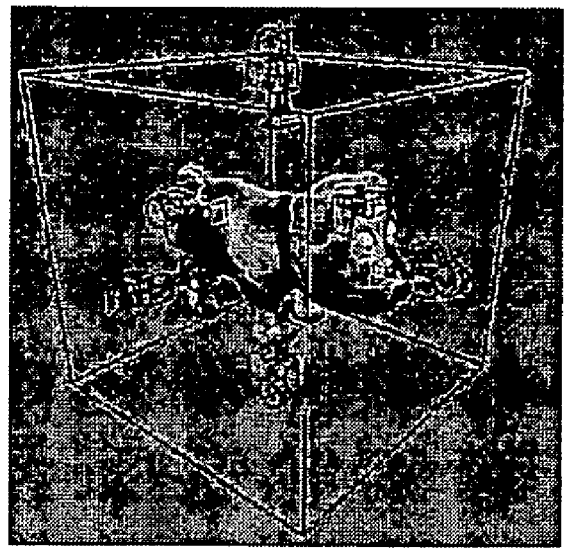
FIGS. 2A and 2B are diagrams illustrating camera bounding volumes (BVs)
Figure 2B:
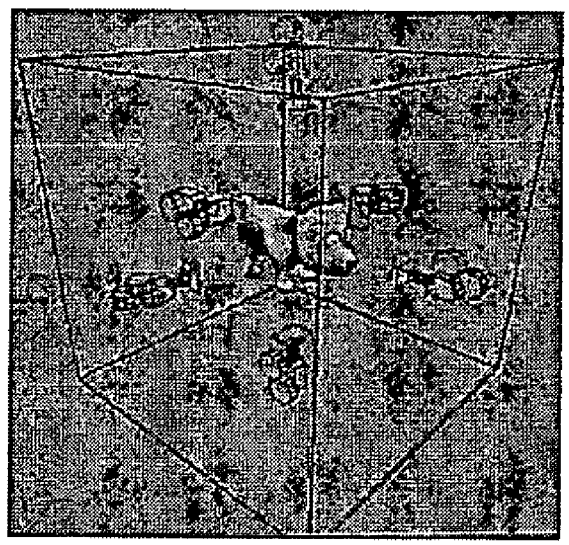

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 3:
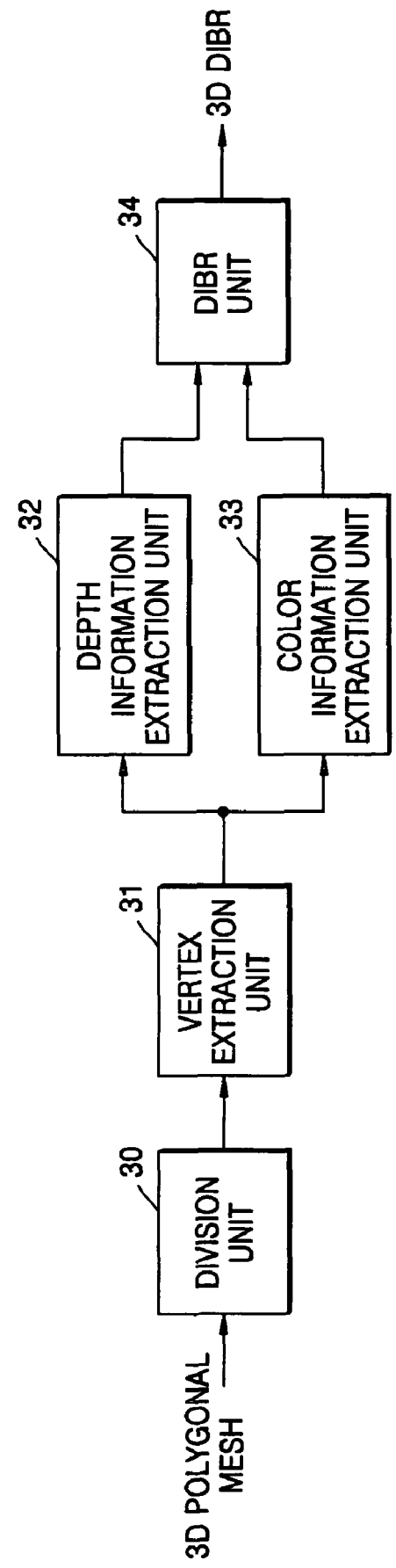
FIG. 3 is a block diagram of a DIBR modeling apparatus according to an exemplary embodiment of the present invention.

FIG. 3 is a block diagram of a DIBR modeling apparatus according to an exemplary embodiment of the present invention. Referring to FIG. 3, the DIBR modeling apparatus includes a division unit 30, a vertex extraction unit 31, a depth information extraction unit 32, a color information extraction unit 33, and a DIBR unit 34. The operation of the DIBR modeling apparatus will now be described in detail with reference to FIG. 4.

Figure 4:
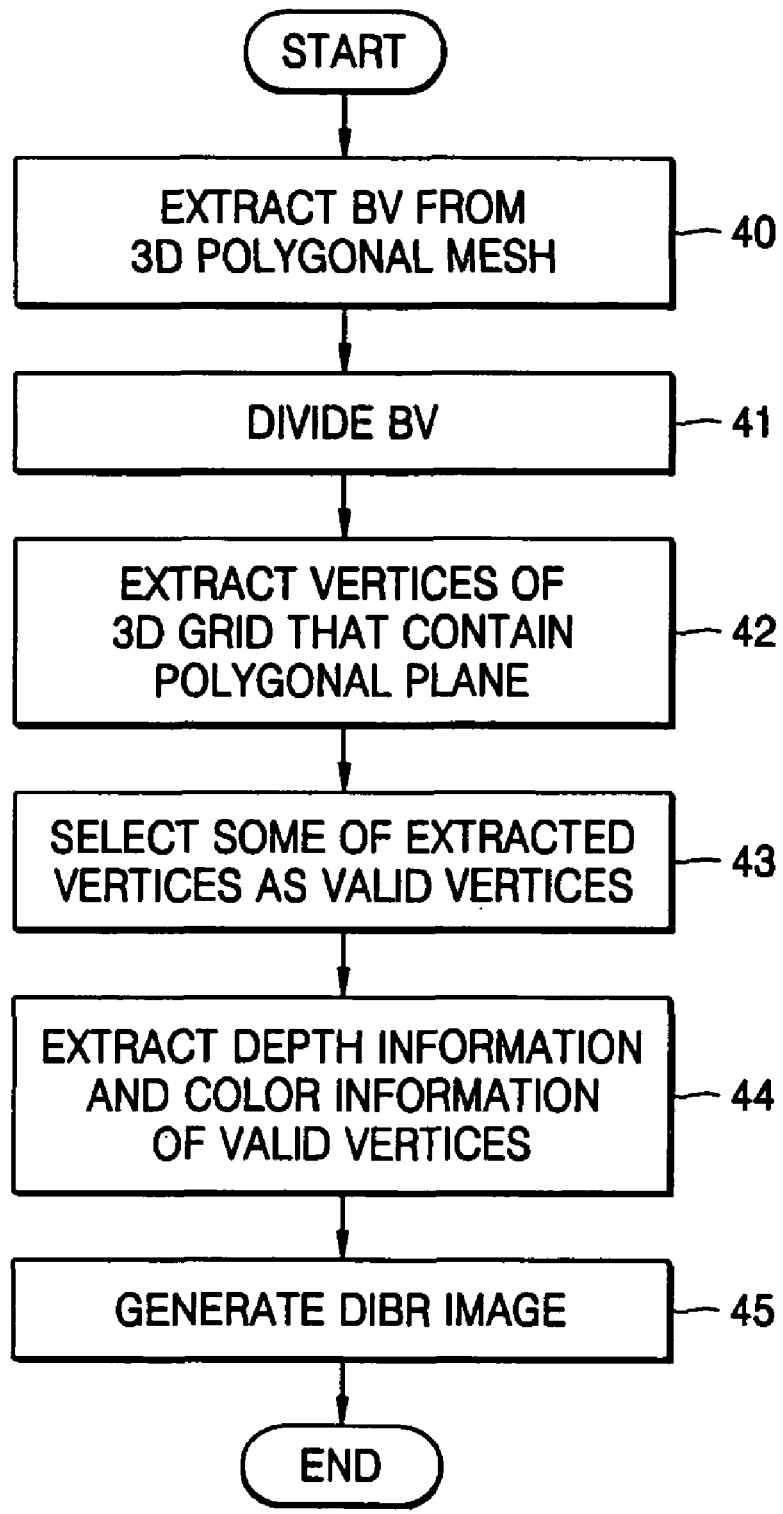
FIG. 4 is a flowchart illustrating a DIBR modeling method according to an exemplary embodiment of the present invention.
Figure 5:
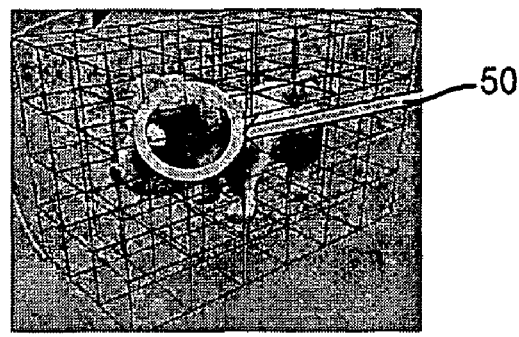
FIG. 5 is a diagram illustrating a 3D grid obtained by dividing a bounding volume (BV) of an object using a plurality of sampling lines.

FIG. 4 is a flowchart illustrating a DIBR modeling method according to an exemplary embodiment of the present invention. Referring to FIGS. 3 and 4, in operation 40, the division unit 30 extracts a bounding volume (BV) from a 3D polygonal mesh obtained using an authoring tool. The BV is generated to have such a minimum size while still surrounding boundaries of an object because, in the present embodiment, unlike in the conventional art, a plurality of virtual cameras does not need to be installed. In operation 41, the division unit 30 obtains a 3D grid by dividing the extracted BV using a plurality of sampling lines. The number of sampling lines used to divide the extracted BV is determined based on a volume resolution, which is proportional to a point resolution. In detail, a DIBR format used in the present embodiment is a point texture format. In the point texture format, each of a plurality of intersection points between the sampling lines and the object has depth information and color information. Therefore, in the present embodiment, once a point resolution of a final 3D DIBR image is set, the number of sampling lines used to divide the extracted BV is automatically determined based on the point resolution. FIG. 5 is a diagram illustrating a 3D grid obtained by dividing a BV using a plurality of sampling lines. The authoring tool used to generate the 3D polygonal mesh may be any conventional 3D graphics tool, such as 3DS Max or Maya.

Figure 6A:
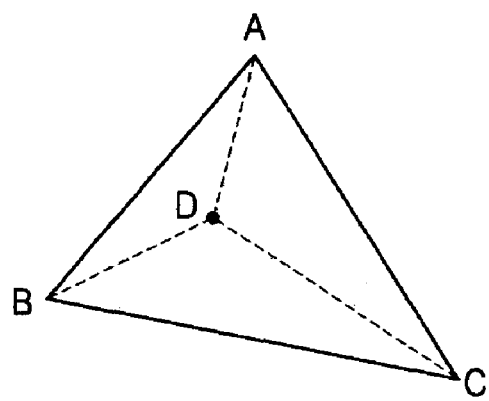
FIGS. 6A and 6B are diagrams illustrating a process of determining whether a vertex of a 3D grid projected onto a polygonal plane is a valid vertex performed in the method illustrated in FIG. 4.
Figure 6B:
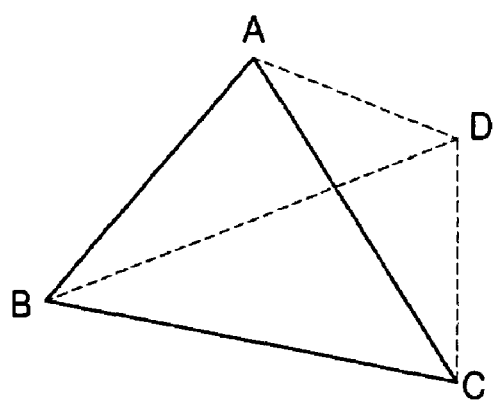

The vertex extraction unit 31 selects some of a plurality of vertices extracted from the 3D grid that intersect the 3D polygonal mesh as valid vertices. In detail, in operation 42, the vertex extraction unit 31 extracts vertices from a plurality of cubes of the 3D grid that contain polygonal planes of the 3D polygonal mesh. Here, if the distance between the center of a cube of the 3D grid and a polygonal plane of the 3D polygonal mesh is smaller than the distance between the center of the cube of the 3D grid and a vertex of the cube of the 3D grid, the cube of the 3D grid is determined to contain the polygonal plane of the 3D polygonal mesh. Then, in operation 43, the vertex extraction unit 31 selects some of the vertices extracted in operation 42 as valid vertices. It is determined whether a vertex is valid by determining whether a projection of the vertex onto a corresponding polygonal plane exists inside the corresponding polygonal plane. It is determined whether the projection of the vertex exists inside the corresponding polygonal plane by determining whether the sum of the areas of polygons into which the corresponding polygonal plane is divided by connecting the projection of the vertex to the corners of the polygonal plane is equal to the area of the corresponding polygonal plane. For example, referring to FIGS. 6A and 6B, D is a projection of a vertex onto the triangle ABC. If the projected vertex D is located inside triangle ABC as illustrated in 6A, the area of $\triangle ABC$ is equal to the sum of the areas of $\triangle ABD$, $\triangle ADC$, and $\triangle BDC$. However, if the projected vertex D is located outside triangle ABC as illustrated in FIG. 6B, the area of $\triangle ABC$ is not equal to the sum of the areas of $\triangle ABD$, $\triangle ADC$, and $\triangle BDC$.

In operation 44, the depth information extraction unit 32 extracts depth information from the valid vertices, and the color information extraction unit 33 extracts color information from the valid vertices.

Figure 7:
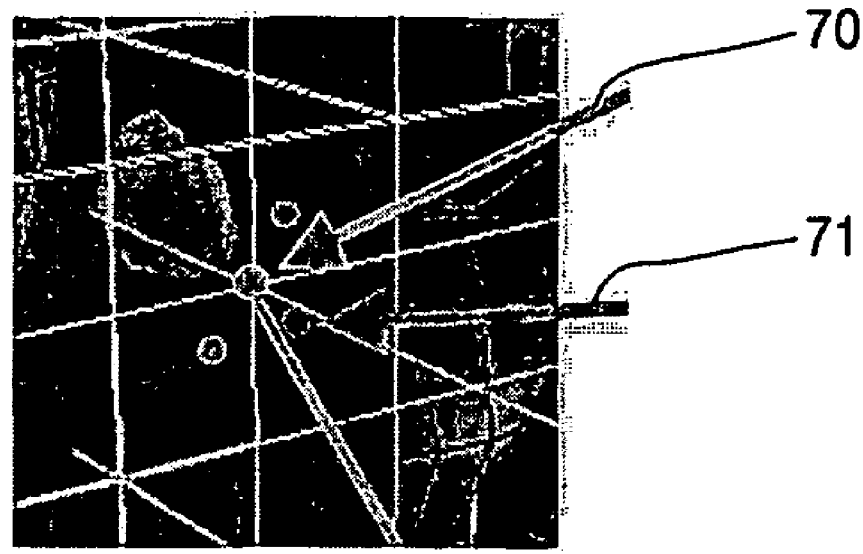
FIG. 7 is a magnified view of a portion 50 of FIG. 5.

The depth information of the valid vertices may be replaced by depth information of vertices of the 3D polygonal mesh that are closest to the respective valid vertices, as illustrated in FIG. 7. FIG. 7 is a magnified view of a portion 50 of FIG. 5. In FIG. 7, reference numeral 70 indicates a grid vertex and reference numeral 71 indicates a polygonal mesh vertex.

Figure 8:
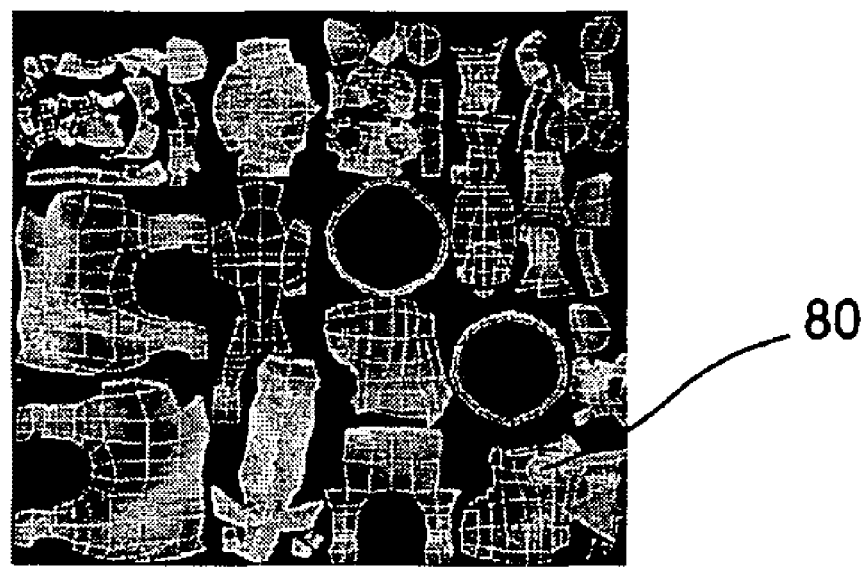
FIG. 8 is a diagram illustrating a texture map of a 3D polygonal mesh.

The color information of the valid vertices may be obtained, as shown in FIG. 8, by converting the coordinates (x, y, z) of each of the valid vertices into texture coordinates (U, V) on a texture map 80 with the use of a Barycentric coordinate system and then converting the texture coordinates (U, V) of each of the valid vertices into a set of RGB values.

In operation 45, the DIBR unit 34 converts the depth information and the color information of the valid vertices into DIBR format information and models the DIBR format information, thereby generating a 3D DIBR image.

Figure 10A:
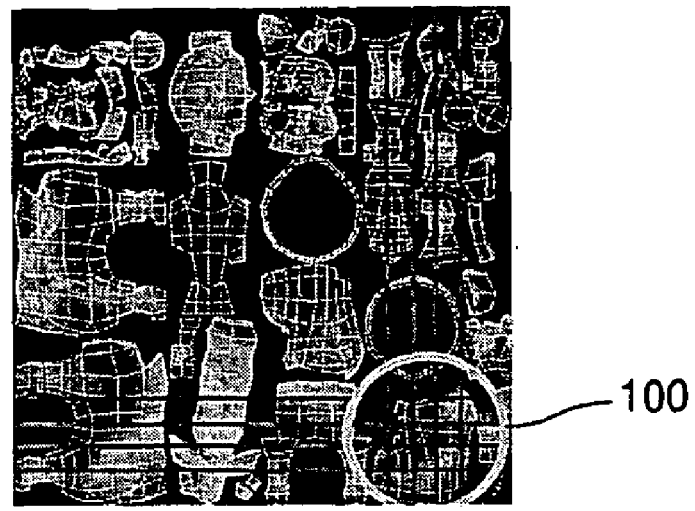
FIG. 10A is a diagram illustrating a grid laid over part of a texture map.

FIG. 9 is a flowchart illustrating a DIBR modeling method according to another exemplary embodiment of the present invention. Referring to FIG. 9, in operation 90, a texture map for a 3D polygonal mesh is generated using the authoring tool that has been described above. In operation 91, a grid is laid over a 2D polygonal mesh contained in the texture map. Here, the grid is generated by using a plurality of sampling lines, as described above. In the present embodiment, like in the previous embodiment, once a point resolution of a final 3D DIBR image is set, the number of sampling lines used to generate the grid is automatically determined proportionally to the point resolution. FIG. 10A illustrates a grid laid over part of a texture map. Even though the sampling lines of the grid are illustrated in FIG. 10A as being spaced a large distance apart, the distance between a pair of adjacent sampling lines of the grid is preferably smaller than the resolution of the 2D polygonal mesh.

Figure 10B:
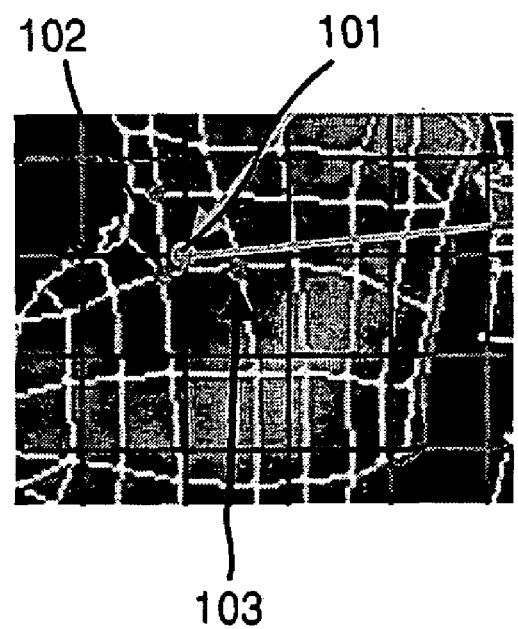
FIG. 10B is a magnified view of a portion 100 of FIG. 10A.

In operation 92, depth information and color information of a plurality of vertices of the 2D polygonal mesh are replaced by depth information and color information of respective closest vertices of the grid. FIG. 10B is a magnified view of a portion 100 of FIG. 10A. Reference numeral 101 indicates a grid vertex. Reference numerals 102 and 103 indicate polygonal mesh vertices, respectively. Depth information and color information of a grid vertex 101 is obtained by using texture coordinates (U, V) of a polygonal mesh vertex 102 that is closest to the grid vertex 101. Color information of the polygonal mesh vertex 102 can be obtained by converting the texture coordinates (U, V) into a set of RGB values, and depth information of the polygonal mesh vertex 102 can be obtained by inversely converting the texture coordinates (U,V) into 3D coordinates (x, y, z) using a Barycentric coordinate system.

In operation 93, the color information and the depth information of each of the vertices of the grid is converted into DIBR format information, thereby generating a 3D DIBR image.

Embodiments of the present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, and an optical data storage device. The computer-readable recording medium can be distributed over a plurality of computer systems connected to a network so that a computer-readable code is written thereto and executed therefrom in a decentralized manner.

According to the above-described embodiments of the present invention, depth information is directly obtained from a polygonal mesh without the need to synthesize a plurality of depth images, and thus is highly precise. In addition, since, in the above-described embodiments of the present invention, there is no need to install a plurality of virtual cameras, it is possible to simplify the overall rendering operation. Moreover, it is possible to extract depth information even from dead angles of the virtual cameras. Furthermore, since, in the above-described embodiments of the present invention, a BV is automatically determined proportionally to a point resolution, a manual adjustment of the BV is unnecessary, and it is possible to improve the quality of a DIBR image.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A depth information-based modeling method using a three-dimensional (3D) polygonal mesh, which is implemented by a computer system, the method comprising:
   extracting a bounding volume (BV) enclosing the 3D polygonal mesh, which is obtained by an authoring tool;
   obtaining a 3D grid by dividing the BV using a plurality of sampling lines;
   selecting some of a plurality of vertices of the 3D grid that intersect the 3D polygonal mesh as valid vertices;
   obtaining depth information and color information of the valid vertices by using a plurality of vertices of the 3D polygonal mesh; and
   modeling an object using the depth information and the color information of the valid vertices,
   wherein the method is performed using at least one processor of the computer system, and
   wherein the selecting some of a plurality of vertices of the 3D grid as the valid vertices comprises:
   extracting some of the vertices of the 3D that contain a polygonal plane of the 3D polygonal mesh; and
   selecting the valid vertices from the extracted vertices by determining whether the projection of the vertex exists inside the corresponding polygonal plane by determining whether the sum of the areas of polygons into which the respective polygonal plane is divided by connecting the projection of the vertex to the corners of the polygonal plane is equal to the area of the corresponding polygonal plane.

2. The depth information-based modeling method of claim 1, wherein the BV has a minimum size required to surround boundaries of the 3D polygonal mesh.

3. The depth information-based modeling method of claim 1, wherein, in the modeling of the object, a point texture format is used.

4. The depth information-based modeling method of claim 3, wherein the number of sampling lines is determined so as to be proportional to a point resolution of a depth image-based representation (DIBR) image resulting from the modeling of the object.

5. The depth information-based modeling method of claim 1, wherein, in the extracting some of the vertices of the 3D grid, when a distance between a center of a cube of the 3D grid and a vertex of the cube of the 3D grid is greater than a distance between the center of the cube of the 3D grid and a polygonal plane of the 3D polygonal mesh, the cube of 3D grid is determined so as to contain the polygonal plane of the 3D polygonal mesh and the vertex of the cube of the 3D grid is extracted.

6. The depth information-based modeling method of claim 1, wherein depth information of the vertices of the 3D polygonal mesh that are respectively closest to the vertices of the 3D grid chosen as the valid vertices is used as the depth information of the valid vertices.

7. The depth information-based modeling method of claim 1, wherein the color information of the valid vertices is obtained by using texture coordinates into which coordinates of the vertices of the 3D polygonal mesh that are respectively closest to the valid vertices are converted.

8. A depth information-based modeling apparatus comprising:
   a division unit which extracts a bounding volume (Bv) enclosing a three-dimensional (3D) polygonal mesh, which is obtained by an authoring tool, and obtains a 3D grid by dividing the BV using a plurality of sampling lines;
   a vertex extraction unit which selects some of a plurality of vertices of the 3D grid that intersect the 3D polygonal mesh as valid vertices;
   a depth information extraction unit which obtains depth information of the valid vertices by using a plurality of vertices of the 3D polygonal mesh;
   a color information extraction unit which generates a texture map for the vertices of the 3D grid and obtains color information of the valid vertices by using texture coordinates on the texture map that correspond to the vertices of the 3D grid; and a modeling unit which models an object using the depth information and the color information of the valid vertices, wherein the vertex extraction unit extracts the vertices of the 3D grid that contain a polygonal plane of the 3D polygonal mesh and selects the valid vertices from the extracted vertices by determining whether the projection of the vertex exists inside the corresponding polygonal plane by determining whether the sum of the areas of polygons into which the respective polygonal plane is divided by connecting the projection of the vertex to the corners of the polygonal plane is equal polygonal plane is equal to the area of the corresponding polygonal plane, and wherein the modeling unit has a memory.

9. The depth information-based modeling apparatus of claim 8, wherein the division unit extracts a BV having a minimum size required to surround boundaries of the 3D polygonal mesh and divides the BV using a number of sampling lines, and wherein the number of sampling lines used to divide the BV is determined with reference to a point resolution of a depth image-based representation (DIBR) image.

10. The depth information-based modeling apparatus of claim 8, wherein the color information of the vertices is obtained by converting coordinates of each of the valid vertices into texture coordinates on the texture map using a Barycentric coordinate system and then converting the texture coordinates of each of the valid vertices into a set of Red, Green, and Blue (RGB) values.

11. A non-transitory computer-readable storage medium encoded with processing instructions for causing a processor to execute a depth information-based modeling method using a three-dimensional (3D) polygonal mesh, the depth information-based modeling method comprising:

extracting a bounding volume (BV) enclosing the 3D polygonal mesh, which is obtained by an authoring tool;

obtaining a 3D grid by dividing the BV using a plurality of sampling lines;

selecting some of a plurality of vertices of the 3D grid that intersect the 3D polygonal mesh as valid vertices;

obtaining depth information and color information of the valid vertices by using a plurality of vertices of the 3D polygonal mesh; and modeling an object using the depth information and the color information of the valid vertices, wherein the selecting some of a plurality of vertices of the 3D grid as the valid vertices comprises:

extracting some of the vertices of the 3D grid that contain a polygonal plane of the 3D polygonal mesh; and selecting the valid vertices from the extracted vertices by determining whether the projection of the vertex exists inside the corresponding polygonal plane by determining whether the sum of the areas of polygons into which the respective polygonal plane is divided by connection the projection of the vertex to the corners of the polygonal plane is equal to the area of the corresponding polygonal plane.

* * * * *

UNITED STATES PATENT AND TRADEMARK OFFICE
CERTIFICATE OF CORRECTION

| | | |
|---|---|---|
| PATENT NO. | : 7,903,111 B2 | |
| APPLICATION NO. | : 11/327350 | |
| DATED | : March 8, 2011 | |
| INVENTOR(S) | : Heesae Lee et al. | |

It is certified that error appears in the above-identified patent and that said Letters Patent is hereby corrected as shown below:

Column 6, Line 52, In Claim 8, delete "(By)" and insert -- (BV) --, therefor.

Column 8, Line 25, In Claim 11, delete "connection" and insert -- connecting --, therefor.

Signed and Sealed this
Fourteenth Day of February, 2012

David J. Kappos
*Director of the United States Patent and Trademark Office*